United States Patent
Shariati (10) Patent No.: US 10,945,081 B2
(45) Date of Patent: Mar. 9, 2021

(54) LOW-LATENCY STREAMING FOR CROS AND BICROS

(71) Applicant: SEMICONDUCTOR COMPONENTS INDUSTRIES, LLC, Phoenix, AZ (US)

(72) Inventor: Hamidreza Shariati, Waterloo (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 20 days.

(21) Appl. No.: 15/888,313

(22) Filed: Feb. 5, 2018

(65) Prior Publication Data
US 2019/0246221 A1 Aug. 8, 2019

(51) Int. Cl.
*H04R 25/00* (2006.01)
*H04W 4/80* (2018.01)
(Continued)

(52) U.S. Cl.
CPC ........... *H04R 25/554* (2013.01); *H04L 1/00* (2013.01); *H04N 21/00* (2013.01);
(Continued)

(58) Field of Classification Search
CPC ...... H04W 28/18; H04W 24/10; H04B 7/026; H04B 7/0608; H04R 25/505; H04R 25/353; H04L 1/04; H04L 1/189
(Continued)

(56) References Cited

U.S. PATENT DOCUMENTS

| 5,339,316 A * | 8/1994 | Diepstraten ........... H04L 1/1607 370/401 |
| 2006/0274747 A1* | 12/2006 | Duchscher ............ H04L 1/0057 370/389 |

(Continued)

FOREIGN PATENT DOCUMENTS

| CN | 105101010 A | 11/2015 |
| EP | 2129170 A1 | 12/2009 |

OTHER PUBLICATIONS

Phonak Insight, "Roger—the new wireless technology standard," 028-0955-02/V1.00, 2013, 4 pages, https://www.phonakpro.com/content/dam/phonak/gc_hq/b2b/en/evidence/insight/Insight_Roger_new_wireless_Technology_028-0955.pdf.

*Primary Examiner* — Alexander Krzystan
*Assistant Examiner* — Julie X Dang
(74) *Attorney, Agent, or Firm* — Ramey & Schwaller, LLP (57) ABSTRACT

Disclosed wireless systems, devices, and methods can leverage existing hardware for BLE communications to provide a low-latency streaming (LLS) link suitable for supporting CROS and BiCROS features in hearing aids. An illustrative embodiment of a low-latency audio streaming method includes: (a) sending intermittent packets of digital audio data as a wireless signal; and (b) for each intermittent packet: (A) listening for a responsive packet; and (B) sending the digital audio data in a retransmitted packet only if no responsive packet is detected. Any retransmitted packet that is sent follows the corresponding intermittent packet with a delay no greater than a length of two interframe spacing (IFS) intervals separated by a responsive packet. An illustrative embodiment of a low-latency audio streaming device includes a transmit chain and a receive chain. The transmit chain periodically transmits intermittent packets of digital audio data as a wireless signal. The receive chain
(Continued)

operates to detect a responsive packet to each intermittent packet. The transmit chain retransmits a packet of digital audio data each time the receive chain fails to detect a responsive packet, ensuring a delay no greater than a length of two IFS intervals separated by a responsive packet.

20 Claims, 4 Drawing Sheets

(51) Int. Cl.
*H04L 1/00* (2006.01)
*H04N 21/00* (2011.01)

(52) U.S. Cl.
CPC ......... *H04R 25/558* (2013.01); *H04R 25/604* (2013.01); *H04W 4/80* (2018.02); *H04R 25/356* (2013.01); *H04R 25/405* (2013.01); *H04R 25/552* (2013.01); *H04R 2225/31* (2013.01); *H04R 2225/51* (2013.01); *H04R 2225/53* (2013.01); *H04R 2225/61* (2013.01)

(58) Field of Classification Search
USPC ......... 455/41.2, 41.3; 381/60, 17, 80, 79, 77
See application file for complete search history.

(56) References Cited

U.S. PATENT DOCUMENTS

| | | | |
|---|---|---|---|
| 2007/0025388 A1* | 2/2007 | Abhishek | H04L 1/188 370/447 |
| 2010/0005360 A1* | 1/2010 | Begen | G06F 11/1443 714/751 |
| 2010/0054512 A1* | 3/2010 | Solum | H04R 25/30 381/315 |
| 2011/0033071 A1* | 2/2011 | Larsen | H04R 25/554 381/315 |
| 2012/0207032 A1* | 8/2012 | Chen | H04W 24/02 370/252 |
| 2012/0243519 A1* | 9/2012 | Koskela | H04W 74/0816 370/338 |
| 2013/0102251 A1* | 4/2013 | Linde | H04L 1/1887 455/41.2 |
| 2014/0064212 A1* | 3/2014 | Ko | H04W 4/80 370/329 |
| 2014/0270211 A1* | 9/2014 | Solum | H04R 25/554 381/60 |
| 2017/0085998 A1* | 3/2017 | Fritsch | H04R 25/554 |
| 2017/0295436 A1* | 10/2017 | Pedersen | H04R 25/405 |
| 2019/0044576 A1* | 2/2019 | Thoen | H04B 5/0031 |
| 2019/0182607 A1* | 6/2019 | Pedersen | H04R 25/407 |

* cited by examiner

LOW-LATENCY STREAMING FOR CROS AND BiCROS

BACKGROUND

When a patient has hearing loss in only one ear, they may be equipped with a pair of hearing aids (one for each ear) that support contralateral routing of signal ("CROS"). CROS communicates the sound from the ear with hearing loss to the good ear, so that the patient can perceive sound equally well from both directions. In other words, the patient is no longer "deaf" on one side.

When a patient has incomplete hearing loss in both ears, they may be equipped with a pair of hearing aids that employ bilateral microphones with contralateral routing of signal ("BiCROS"). BiCROS communicates the sound from each ear to the other, so that each hearing aid can combine the sound from both ears to maximize the intelligibility of the sound.

Whether or not they support the CROS or BiCROS features, modern hearing aids are often equipped with Bluetooth or Bluetooth Low Energy (BLE) support that enables the control signals and digital audio streams to be wirelessly communicated. Wireless communication support enables the patient to more easily configure and control operation of the hearing aids than would be the case if they had to operate small dials and switches on the hearing aid itself. Further, the patient can be alerted to events (such as the ringing of a phone or lapsing of a timer) that they might otherwise have difficulty hearing. The hearing aids can also convert digital audio streams directly into sound in the ear, thereby improving sound quality.

BLE lacks any adequate support for CROS or BiCROS because it lacks a robust delivery mechanism with sufficiently low latency. To support these features, it has been proposed that the hearing aids incorporate near field magnetic induction (NFMI) signaling hardware, requiring additional space and undesirably increasing complexity.

SUMMARY

Accordingly, there are disclosed herein wireless systems, devices, and methods that can leverage existing hardware for BLE communications to provide a low-latency streaming (LLS) link suitable for supporting CROS and BiCROS features in hearing aids. An illustrative embodiment of a low-latency audio streaming method includes: (a) sending intermittent packets of digital audio data as a wireless signal; and (b) for each intermittent packet: (A) listening for a responsive packet; and (B) sending the digital audio data in a retransmitted packet only if no responsive packet is detected. Any retransmitted packet that is sent follows the corresponding intermittent packet with a delay no greater than a length of two interframe spacing (IFS) intervals separated by a responsive packet.

An illustrative embodiment of a low-latency audio streaming device includes a transmit chain and a receive chain. The transmit chain periodically transmits intermittent packets of digital audio data as a wireless signal. The receive chain operates to detect a responsive packet to each intermittent packet. The transmit chain retransmits a packet of digital audio data each time the receive chain fails to detect a responsive packet, providing a retransmission delay no greater than a length of two interframe spacing (IFS) intervals separated by a responsive packet.

An illustrative embodiment of a wireless system includes a first hearing aid for a first ear and a second hearing aid for a second ear. The first hearing aid includes a microphone to capture and digitize an input audio signal into digital audio data, and a first wireless transceiver. The first wireless transceiver operates to send a wireless signal having intermittent packets of the digital audio data, to receive a responsive packet beginning one interframe spacing (IFS) interval after each intermittent packet, and, if a responsive packet is missed, to resend the digital audio data in a retransmission packet beginning one IFS interval after an expected completion of the responsive packet that is missed. The second hearing aid includes: an output transducer that produces an output audio signal based at least in part on the digital audio data in said intermittent packets or said retransmission packets, and a second wireless transceiver. The second wireless transceiver operates to receive said intermittent packets, to send a responsive packet beginning one IFS interval after each intermittent packet that is received, and, if an intermittent packet is missed, to receive a retransmission packet beginning one IFS interval after an expected completion of a responsive packet.

Each of the foregoing embodiments may be employed separately or conjointly, and may optionally include one or more of the following features in any combination: (1) a connection period for the intermittent packets is about 2 milliseconds. (2) the IFS intervals are each less than 100 microseconds. (3) the responsive packet has a length less than 100 microseconds. (4) any retransmitted packet that is sent is transmitted on a different wireless frequency than the corresponding intermittent packet. (5) any retransmitted packet that is sent includes additional error correction information relative to the corresponding intermittent packet. (6) the digital audio data is for contralateral routing of signal (CROS). (7) the responsive packet is an acknowledgement packet. (8) the responsive packet comprises a responsive digital audio packet for bidirectional CROS. (9) the transmit chain sends an acknowledgement packet only if the responsive digital audio packet is successfully received. (10) after the transmit chain sends the retransmitted packet, the receive chain operates to detect a responsive retransmitted packet. (11) the transmit chain performs frequency hopping by changing to a next frequency in a channel list before sending a next intermittent packet, the "next" frequency being determined pursuant to a circular or pseudo-random ordering of the channels. (12) the transmit chain employs a reduced channel list for frequency hopping until at least one responsive packet is detected. (13) the device negotiates at least one low latency streaming parameter via a Bluetooth Low Energy (BLE) link before sending said intermittent packets. (14) the at least one low latency streaming parameter comprises a timing offset between BLE connection intervals and connection intervals for sending the intermittent packets. (15) the responsive packets include digitized audio data from an input transducer in the second hearing aid. (16) the first hearing aid includes an output transducer that produces an augmented audio signal based on the digital audio data from the microphone and the digitized audio data from the input transducer.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1A:
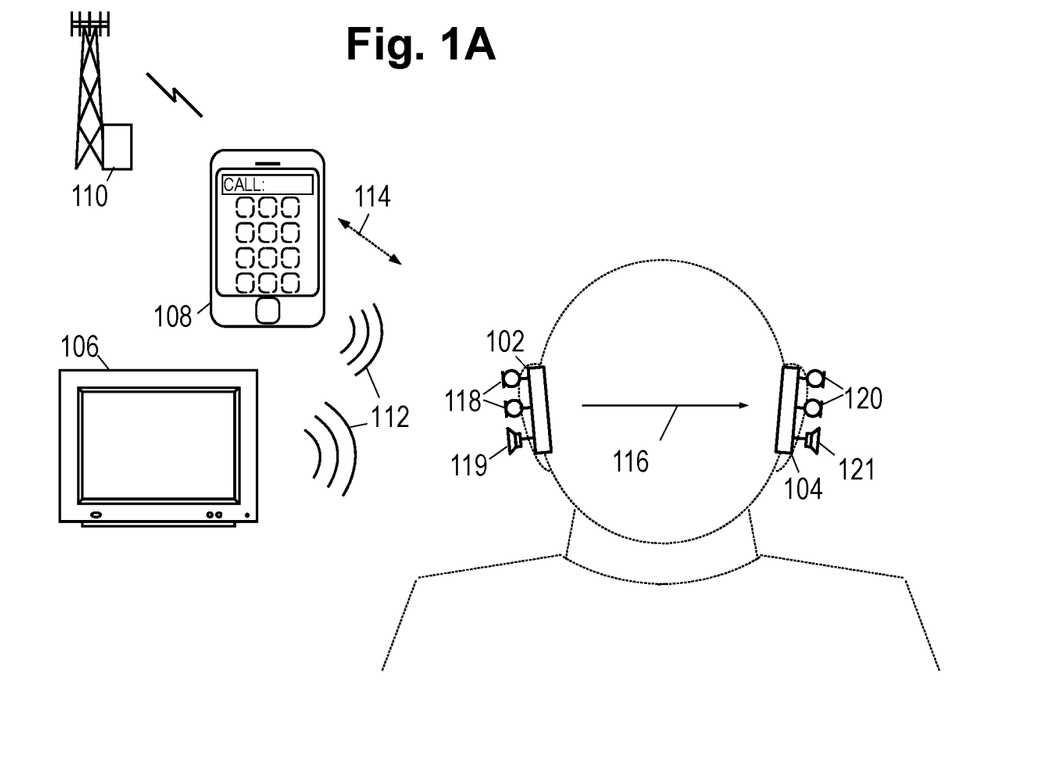
FIG. 1A is an environmental view of an illustrative wireless system.

FIG. 1A is an environmental view of an illustrative wireless system. The illustrative system includes two accessory devices 102, 104, two media devices 106, 108, and a network access point 110. The illustrated accessory devices 102, 104 are hearing aids that support audio streaming, CROS, and/or BiCROS features, but other suitable accessory devices include headsets, body-mounted cameras, mobile displays, or other wireless devices that can receive or send a data stream from/to a media device using a wireless streaming protocol. Received data streams may be rendered as vibrations, beeps, analog sound, videos, and the like.

Illustrated media device 106 is a television generating sound 112 as part of an audiovisual presentation, but other sound sources are also contemplated including doorbells, (human) speakers, audio speakers, computers, and vehicles. Illustrated media device 108 is a mobile phone, tablet, or other processing device, which may have access to a network access point 110 (shown here as a cell tower). Media device 108 sends and receives streaming data, playing sound 112 to enable a user to converse with (or otherwise interact with) a remote user, service, or computer application. As described in greater detail elsewhere, an array of one or more microphones 118 and 120 may receive sound 112, which the accessory devices 102, 104 digitize, process, and play through earphone speakers 119, 121 in the ear canal. The accessory devices 102, 104 employ a low latency streaming (LLS) link 116 to convey the digitized audio between them, enabling improved audio signals to be rendered by the speakers 119, 121.

Media device 108 may be further configured (e.g., by a downloadable application) to communicate with the accessory devices 102, 104 over a wireless link 114, enabling device 108 to act as a remote-control device that wirelessly monitors and controls the settings of the accessory devices 102, 104. Thus, for example, media device 108 may monitor a battery charge for each of the accessory devices 102, 104 and alert the user when recharging is needed. The media device 108 may further be used for switching power on and off, volume control, equalization, filtering, and in general adjusting any parameter that affects the rendering of the data streams and sounds received by the accessory devices, or any parameter that affects the data stream acquisition by, and transmission from, the accessory devices.

Figure 1B:
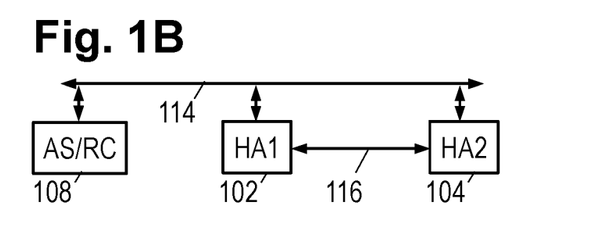
FIG. 1B is a wireless network link diagram of an illustrative wireless system.

As shown in FIG. 1B, the wireless link 114 may operate as a shared, multi-access bus supporting communications among each of the system components. However, this is not a requirement, as multiple point-to-point links can be used in place of a multi-access configuration. FIGS. 1A and 1B further show a point-to-point wireless link 116 for implementing (in the case of hearing aids) "ear-to-ear" communications between the accessory devices 102, 104. For CROS and BiCROS operation, the accessory devices detect, digitize, and apply monaural processing to the sound received at that ear. One or both of the accessory devices convey the digitized sound as a cross-lateral signal to the other accessory device via the dedicated point-to-point link 116. The receiving device(s) apply a binaural processing operation to combine the monaural signal with the cross-lateral signal, before converting the combined signal to an in-ear audio signal for delivery to the user's ear.

Multimedia data streaming entails rendering ("playing") the content represented by the data stream as it is being delivered. Data streaming is routinely provided over various wireless protocols such as LTE, WiFi, and Bluetooth, which employ wireless network packets to carry the data payloads to the target device. Channel noise and interference may cause packet loss, so the various protocols may employ varying degrees of buffering, redundancy, and retransmission to provide reliable delivery. However, the existing protocols and systems are infeasible for systems having strict latency limits. For example, latencies in excess of 200 ms are noticeable to participants in a conversation and widely regarded as undesirable. To support CROS and BiCROS features, very low latencies (e.g., below 5 ms end-to-end, i.e., including not only the transmission delay but also the delays due to audio compression, coding, buffering, synchronization, sampling-rate conversion, decoding, decompression, and any other implementation delays) are required to avoid undesirable "echo" effects. (To accommodate such other delay contributors, the wireless link should minimize the transmission latency.) In energy-limited applications, such as hearing aids, the latency requirements must be met while the operation is subject to strict power consumption limits. In power limited applications, an intermittent wireless packet communication protocol, such as Bluetooth Low Energy (BLE) or one of the IEEE 802.15.4-compliant low-rate wireless personal area network (LR-PAN) protocols (e.g., ZigBee, Thread) may be employed, but the intermittent operation of the RF hardware also creates potential barriers to meeting the latency requirements.

Figure 2A:
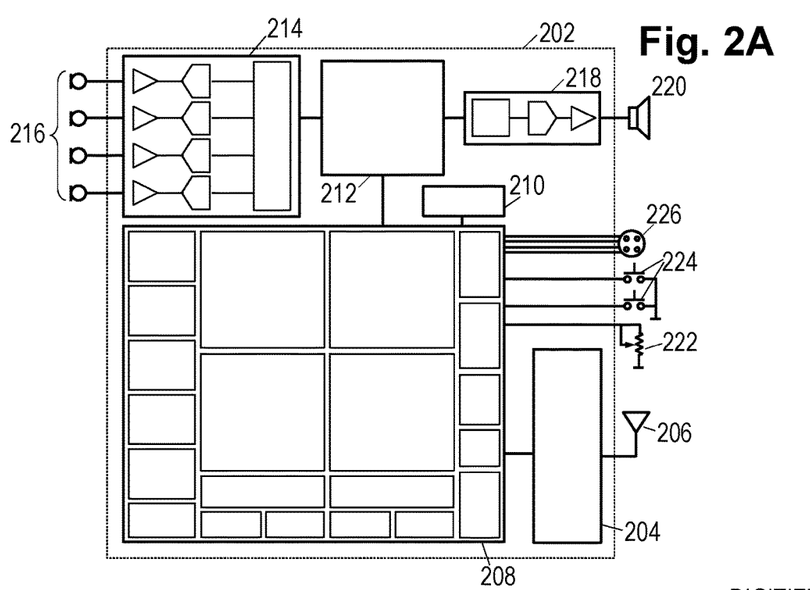
FIG. 2A is an integrated circuit layout diagram of an illustrative wireless device.

FIG. 2A is a block diagram of an illustrative wireless accessory device 202 that supports the use of a low-latency wireless streaming protocol suitable for CROS and BiCROS operation. The accessory device may be a hearing aid or wearable device, though the principles disclosed here are applicable to any wireless network device. Device 202 includes a radio frequency (RF) module 204 (at times referred to as a radio module) coupled to an antenna 206 to send and receive wireless communications. The radio module 204 is coupled to a controller 208 that sets the operating parameters of the radio module 204 and employs it to transmit and receive wireless control communications and wireless streaming communications. The controller 208 is preferably programmable, operating in accordance with firmware stored in a nonvolatile memory 210. A volatile system memory 212 may be employed for digital signal processing and buffering.

A signal detection unit 214 collects, filters, and digitizes signals from local input transducers 216 (such as a microphone array). The detection unit 214 further provides direct memory access (DMA) transfer of the digitized signal data into the system memory 212, with optional digital filtering and downsampling. Conversely, a signal rendering unit 218 employs DMA transfer of digital signal data from the system memory 212, with optional upsampling and digital filtering prior to digital-to-analog (D/A) conversion. The rendering unit 218 may amplify the analog signal(s) and provide them to local output transducers 220 (such as a speaker array).

Controller 208 extracts digital signal data from the wireless streaming packets received by radio module 204, optionally buffering the digital signal data in system memory 212. The controller 208 may collect the digital signal data as it is acquired into data payloads for the radio module to frame and send as cross-lateral data via the point-to-point wireless link 116, and may further provide to the memory 212 cross-lateral signal data received by the radio module via the point-to-point wireless link 116. The controller 208 or the signal rendering unit 218 combines the digital signal data with the cross-lateral signal data, applying filtering and digital signal processing as desired to produce a digital output signal which may be directed to the local output transducers 220. Controller 208 may further include general purpose input/output (GPIO) pins to measure the states of control potentiometers 222, switches 224, and terminals of a diagnostic connector 226. The controller 208 may use those states to provide for manual or local control of on/off state, volume, filtering, and other rendering parameters.

At least some contemplated embodiments of controller 208 include a RISC processor core, a digital signal processor core, special purpose or programmable hardware accelerators for filtering, array processing, and noise cancellation, as well as integrated support components for power management, interrupt control, clock generation, and standards-compliant serial and parallel wiring interfaces. The software or firmware stored in memories 210, 212, may cause the processor core(s) of the controller 208 to implement a low-latency wireless streaming method and other wireless protocols, coordinating their operation to enable non-interfering coexistence between the protocols.

Figure 2B:
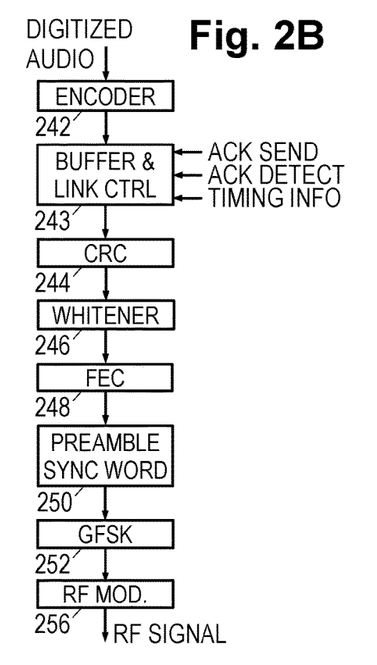
FIG. 2B is a data flow diagram of an illustrative transmit chain.
Figure 2C:
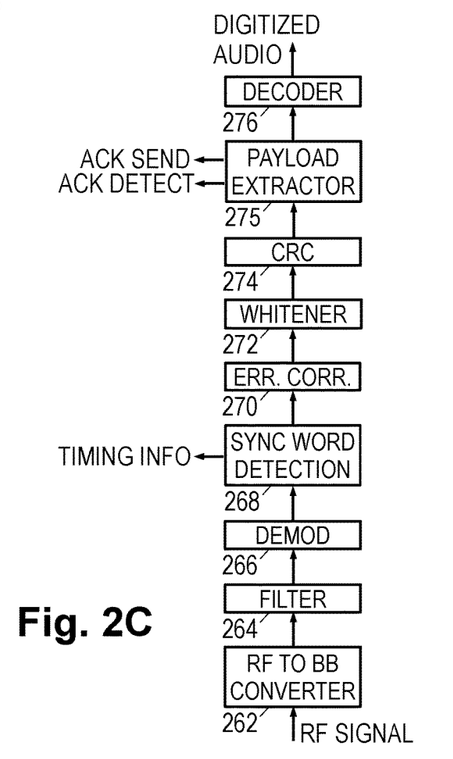
FIG. 2C is a data flow diagram of an illustrative receive chain.

In at least some contemplated embodiments, the radio module 204 alternates between sending and receiving packets via the antenna 206, alternately employing the transmit chain and receive chain shown in FIGS. 2B and 2C.

FIG. 2B shows an illustrative transmit chain that may be implemented by the radio module 204, alone or in combination with the controller 208. An encoder 242 encodes the digitized audio signal to provide blocks of compressed data. A link control module 243 buffers the encoded audio signal as needed to synchronize transmission with a predetermined connection interval. The link control module 243 further communicates with the receive chain to determine whether an acknowledgement packet has been received, and if not, the link control module 243 promptly re-sends the encoded audio signal. Still further, the link control module 243 monitors the receive chain to determine when an acknowledgement packet should be sent, and promptly sends the appropriate data block for an acknowledgement packet when that condition is detected.

A cyclic redundancy checksum (CRC) unit 244 calculates and appends a checksum for each block, and whitener 246 applies a pseudorandom bit mask to each block. A forward error correction (FEC) encoder 248 optionally adds a controlled amount of redundancy to the blocks to enable detection and/or correction of bit or symbol errors. A framing module 250 takes one or more blocks of encoded, whitened data as a frame payload and prepends a frame header to each payload, including a preamble (to mark the beginning of a frame) and a sync word (to enable timing synchronization at the receiver). In at least some contemplated embodiments, each packet consists of a one-byte preamble, a two-byte frame header, the payload, and a two-byte CRC value. The header preferably includes a payload length value, enabling the data rate to be adjusted dynamically. As mentioned further below, the protocol may employ frequency hopping, and accordingly the frame header may include a hop counter to indicate a current position in the channel frequency rotation.

A Gaussian frequency shift keying (GFSK) modulator converts the stream of bits from framing module 250 into a digitized baseband signal representing a series of shaped pulses that provide smooth variation of a carrier frequency signal. Radio frequency modulator 256 frequency modulates an RF carrier frequency signal using the digitized baseband signal, feeding the modulated signal to the antenna to transmit a wireless signal.

FIG. 2C shows an illustrative receive chain that may be implemented by the radio module 204. An RF-to-baseband converter 262 converts a received RF signal to a digitized baseband signal. A filter 264 maximizes the signal to noise ratio before a demodulator 266 converts the baseband signal into a bit stream. A synchronization word detector 268 detects the sync words from the frame headers and byte-aligns the stream for subsequent processing. The sync word detector further determines the timing information associated with the frame header and communicates that timing information to the link controller 243 in the transmit chain.

If FEC encoder 248 is employed on the transmit side, an error correction module 270 detects and/or corrects errors in the payload. Whitener 272 applies the pseudorandom bit mask to reverse the effect of transmit-side whitener 246, and CRC checker 274 verifies that the payload has been properly received. If so, a payload extractor 275 triggers the sending of an acknowledgement packet by link control module 243. The payload extractor 275 also detects whether the receive packet is an acknowledgement packet and notifies the link control module 243 accordingly. For data packets, the payload extractor 275 discards the frame headers and checksum fields, and forwards the "payloads" containing the encoded audio blocks to the decoder 276, which converts the compressed audio data blocks into a digitized audio signal.

Figure 3A:
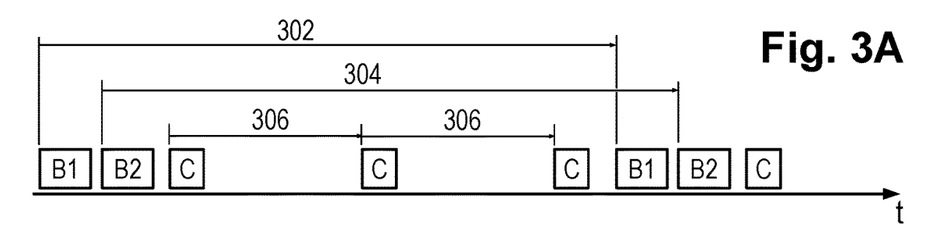
FIG. 3A is a timeline showing connection events for an illustrative combination of wireless protocols.
Figure 3B:
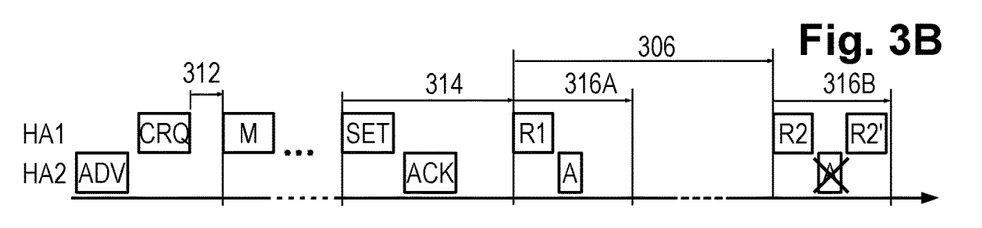
FIG. 3B is a timeline of an illustrative BLE-assisted startup of a streaming protocol.
Figure 3C:
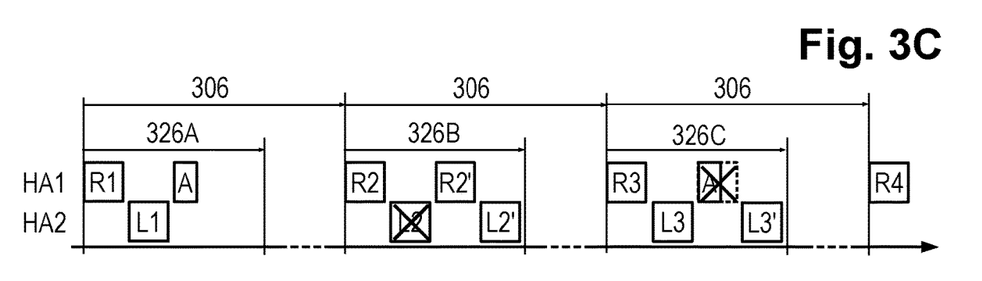
FIG. 3C is a timeline for an illustrative bidirectional streaming protocol.

FIGS. 3A-3C provide various timelines to illustrate the operation of the radio module 204 (and link control module 254). Radio module 204 preferably operates in accordance with the Bluetooth Low Energy (BLE) standard, meaning that it periodically turns on the receive and transmit hardware periodically to listen for and send data packets. The connection times are scheduled, enabling the RF module to be powered down the rest of the time. Depending on the data transmission (and retransmission) requirements, the RF module may be operating substantially less than 10% of the time, thereby extending the battery life of the accessory devices. For explanatory purposes, the connection times are not drawn to scale in FIGS. 3A-3C.

FIG. 3A shows intermittent connection intervals B1 for an illustrative BLE link that may be used for control data communications between the accessory devices 102, 104 and media device 108. BLE may also be used for streaming communications that permit longer latencies. The connection intervals B1 are only a small fraction of the connection period 302 for the BLE link, enabling the remainder of the period to be employed for other purposes. For example, a second point-to-point BLE link may employ connection intervals B2 with an equal connection period 304, effectively interleaving the connection intervals of both BLE links.

Compared to a typical BLE connection interval and period, a low-latency communications protocol may employ smaller, more frequent packets. As an example, FIG. 3A shows shorter connection intervals C having a connection period 306 that is only ⅓ of the coexisting BLE connection period 302, 304. If the connection periods are related by an integer ratio, the relative timing can usually be adjusted to ensure that no conflict occurs, i.e., that different links aren't simultaneously demanding different operations from the Radio module. The connection intervals and required data rates will impose design constraints on the connection periods chosen for each protocol.

FIG. 3B shows a timeline for transmissions between two accessory devices HA1, HA2, employing a BLE-assisted startup for the low-latency protocol. Upon startup, the devices HA1, HA2 may begin periodically sending advertising packet ADV to notify nearby devices that it is available for a wireless connection. In FIG. 3B, one such ADV packet is shown being sent from HA2. The other device, upon detecting such a packet, may respond with a connection request CRQ, specifying an offset 312 from the end of the packet. The offset 312 sets an initial anchor point, from which subsequent connection intervals and periods are measured. Thereafter, the beginning of each BLE connection interval marks the next anchor point.

Depending on the contents of the ADV and CRQ packets, one of the devices becomes the master of the link, in charge of initiating each connection interval and controlling the link timing. The link master initiates each connection interval B1 by sending a Master packet, to which the slave device(s) may respond. Multiple master-slave packet exchanges may occur during a single connection interval, during which the master and slave may negotiate operating parameters for the low-latency communications link. It is preferred that the low-latency communications link employ the same radio module and antenna that are already available for BLE communications, so the operating parameters may be limited to the length of the connection interval C, the connection period 306, and whether the link is used to support unidirectional (CROS) or bidirectional (BiCROS) communications. Other potentially-negotiated parameters include channel lists for frequency hopping and retransmission, which as discussed elsewhere may include a different pair of channel lists for the link establishment stage than the pair of channel lists used for normal operations. Then in a subsequent connection interval B1, the link master may send a SET packet to set the offset 314 that defines an initial anchor point for the low latency streaming link. The receiving device may respond with an ACK packet to confirm receipt.

As with the BLE communications, the master for the low latency streaming link controls the link timing, marking the beginning of each connection interval C with the transmission of a data packet. In FIGS. 3B and 3C, the low latency streaming link data packets are marked "R" to represent a transmission from the right ear by device HA1, "L" to represent a transmission from the left ear by device HA2, and numbered 1, 2, 3, . . . to indicate their sequential order. A retransmitted data packet is marked with a prime "accent". Low latency streaming link acknowledgement packets are marked "A". In the illustrated example, HA1 is acting as the low latency streaming link master, initiating each connection interval C with the transmission of a data packet R. For unidirectional signal (CROS) communication as shown in FIG. 3B, HA2 acknowledges successful reception of the data packet R by sending an acknowledgement packet A as shown in connection interval 316A. If, as shown in connection interval 316B, the acknowledgement packet A isn't successfully received, HA1 performs a retransmission of the (possibly modified) data packet R2'. Only one attempt at retransmission is made, so no acknowledgement packet need be sent or detected for a retransmitted data packet.

FIG. 3C shows a sequence of connection intervals 326A-326C for an example of bidirectional signal (BiCROS) communication. Link master HA1 initiates connection interval 326A with the transmission of a data packet R1. HA2 acknowledges successful reception of the data packet R1 by transmitting a data packet L1. HA1 in turn acknowledges successful reception of data packet L1 by sending an acknowledgement packet A. If transmission of data packet R2 is unsuccessful (and HA2 sends no data packet L2) or, as shown in connection interval 326B, if HA1 fails to receive the data packet L2 indicating successful reception of the R2 data packet, then HA1 retransmits the (possibly modified) data packet R2'. HA2 then responds with a retransmission of the (possibly modified) data packet L2'. If, as shown in connection interval 326C, the data packet L3 is not successfully received, or even if it is and the acknowledgement packet A is unsuccessful, HA2 retransmits the data packet L3'.

To enable a graceful switch between receiving and transmitting modes, the packets sent by HA1 and by HA2 are separated by a predefined interframe spacing (IFS), which in some implementations may be on the order of 50 or 100 microseconds. The data packet lengths may be a negotiated or preset parameter, enabling the devices to accurately schedule retransmissions if the expected acknowledgements or responsive data packets are missing. For unidirectional signal communication, the maximum length of the connection interval is the sum of two data packet lengths with an acknowledgement packet length and two IFS intervals. For bidirectional signal communication, the maximum length of the connection interval 326B is the sum of four data packet lengths with three IFS intervals. If the data packet lengths are limited to about 100 microseconds, the connection interval may be between 0.4 and 0.7 milliseconds. The maximum transmission latency is the sum of the maximum connection interval 316B with the connection period 306, and in at least some contemplated embodiments the maximum transmission latency may be about 2.6 milliseconds for unidirectional (CROS) communication. This value allows for additional latencies in the electronics while still enabling the total rendering latency to be kept below 5 milliseconds.

Preferably, like the BLE protocol, the low latency streaming protocol employs frequency hopping, using an ordered set of channels for each packet exchange. Thus, for example, R1 and R2 (in FIG. 3B), or R1, R2, R3, and R4 (in FIG. 3C) are sent on different channels, using a predetermined set of channels in an order that is agreed upon during the setup of the channel. The accessory devices may share a channel list that specifies the order in which the channels are employed. Each time the end of the list is reached, the list is repeated from the beginning. The receiving device thus knows which channel to use for receiving a data packet, and may use that same channel to send an acknowledgement packet A or a responsive data packet L1-L4.

In some embodiments, retransmitted data packets may occur on the same channel as the originally transmitted data packets, but to increase the probability of a successful retransmission it may be preferred to use a different channel from the original transmission. (This use of a different frequency combats packet losses caused by fading or interference.) To that end, a retransmission channel list may be shared between the devices to be used in the event that the initial transmissions are unsuccessful. The retransmission channel list may employ the same set of channels as the original channel list, albeit in a different order. A different entry is associated with each connection interval, and the lists have the same length so that the devices reuse the two lists in synchronization with each other.

To further increase the probability of a successful retransmission, the retransmitted data packets may employ FEC coding to add a controlled amount of redundancy to the retransmitted data packet to enable improved error correction at the receiver. As the number of retransmissions is expected to be fairly low, it is believed that the extra computational burden associated with FEC encoding and error correction can be kept low.

Figure 4:
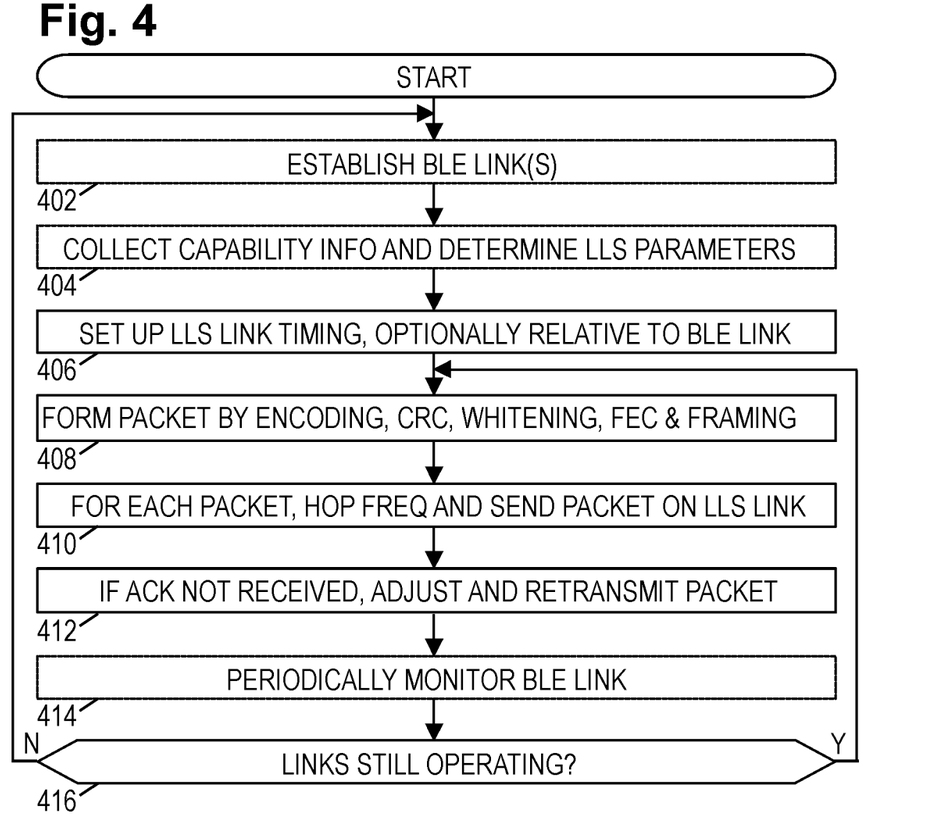
FIG. 4 is a flow diagram of an illustrative audio streaming method.

FIG. 4 is a flow diagram of an illustrative audio streaming method that employs the foregoing principles. In block 402, an accessory device establishes a BLE link with an audio source such as another accessory device that supports CROS or BiCRO features. An existing BLE standard provides a procedure for this which will be known to those of ordinary skill in the art.

In block 404, the accessory device employs the BLE link to exchange capability information with the audio source and negotiate low latency streaming parameters supported by both ends of the link. In block 406, the accessory device sends a SET packet over the BLE link to establish the timing (i.e., the anchor offset) of the low latency streaming link relative to the BLE link timing. In block 408, the constructs an audio data packet for transmission via the low latency streaming link. As described previously, the construction may include encoding the audio data in a compressed form, appending a checksum, whitening with a bit mask, forward error correction, and prepending a frame header. In block 410, the accessory device initiates a connection interval by selecting the next frequency from the channel list and sending the audio data packet. In block 412, the accessory device waits for an interframe spacing (IFS) interval and begins listening for an acknowledgement packet (CROS mode) or a responsive data packet (BiCROS mode) to verify that the audio data packet transmission was successful. For BiCROS mode operation, the accessory device indicates success with an acknowledgement packet. If the transmission success is not verified, then in block 412 the accessory device performs a retransmission. For BiCROS mode operation, the retransmission is followed by listening for a retransmitted data packet from the other end of the link. The retransmissions may be performed on a different frequency than the original transmission as specified by a retransmission channel list. In some contemplated embodiments, the retransmissions further include added FEC parity information absent from the original transmissions.

After the optional retransmission, the accessory device, the low latency streaming link becomes inactive until it is time for the next LLS connection interval. In the interim, the accessory device in block 414 periodically monitors one or more coexisting BLE links by transmitting and/or listening at appropriate connection interval times. In block 416, the accessory device confirms that the links are still operating, and if so, returns to block 408 for the creation of the next LLS data packet.

The foregoing describes the use of a BLE link to establish the LLS link, leveraging the BLE anchor points to set anchor point timing for the LLS connection intervals. In situations where an established BLE link is not available, the accessory device may employ a set of default parameters to set the LLS connection interval and period timing. Thus, with reference to FIG. 4, blocks 402, 404, and 414 are optional and may be omitted. In block 406, the accessory device (after first listening for LLS transmissions from another device) may begin sending LLS data packets and listening for acknowledgement packets. To accelerate the establishment of an LLS link, the device may employ a two-stage approach with block 410. During the first stage (i.e., prior to establishment of the link), the device employs a limited channel list for original transmissions and a similarly limited channel list for retransmissions. For example, each list may have only four entries.

The device sends an LLS data packet on a first original transmission frequency, listens for an acknowledgement packet, and if none is received, the device sends a retransmitted packet on a first retransmission frequency. For the next connection interval, the device sends an LLS data packet on a second original transmission frequency from the channel list, listens for an acknowledgement, and if none is received, sends a retransmitted packet on a second retransmission frequency from the retransmission channel list. The process continues until the end of the limited channel lists are reached, and if no acknowledgement packets have been received, the device remains in the first stage and begins again with the first entries in the limited channel lists. The limited channel lists are reused as needed until acknowledgement packets begin to arrive. If at least one acknowledgement packet is received when the device reaches the end of the list, the device enters the second stage, switching to the full channel lists for frequency hopping. Because the channel lists are reduced during the first stage, each device need only listen on a reduced number of channels (or for a shorter time on a single channel) to detect and synchronize with the LLS link timing established by the other device.

Because the described LLS protocol employs the same hardware as the BLE communications link, low latency streaming can be provided without requiring any additional RF modules, antennas, and associated hardware, enabling the accessory devices to support CROS and BiCROS features without increasing device size, complexity, and cost. In addition to hearing aids, the disclosed LLS protocol is also useful for conveying low latency audio streams from microphones during concerts, conferences, and other live events.

That is, while the foregoing embodiments have focused on the establishment and use of an LLS link for ear-to-ear streaming, the foregoing principles are expected to be useful for many applications, particularly those involving audio streaming to or from smart phones or other devices supporting BLE communications for interfacing and control. Other examples where a low-latency streaming links may be useful include guidance and/or feedback control for fast-moving, fast-changing, or unstable systems.

Any of the controllers described herein, or portions thereof, may be formed as a semiconductor device using one or more semiconductor dice. Though the operations shown and described in FIG. 4 are treated as being sequential for explanatory purposes, in practice the method may be carried out by multiple integrated circuit components operating concurrently and perhaps even with speculative completion. The sequential discussion is not meant to be limiting. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. The terms first, second, third and the like in the claims or/and in the Detailed Description or the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. Inventive aspects may lie in less than all features of a single foregoing disclosed embodiment. Furthermore, while some embodiments described herein include some but not other features included in other embodiments, combinations of features of different embodiments are meant to be within the scope of the invention, and form different embodiments, as would be understood by those skilled in the art.

What is claimed is:

1. A low-latency audio streaming method that comprises:
   sending intermittent packets of digital audio data as a wireless signal; and
   for each intermittent packet:
      listening for a responsive packet with a predefined length and a start time of one predefined interframe spacing (IFS) interval after the intermittent packet; and
      sending the digital audio data in a retransmitted packet only if said responsive packet is not detected,
   wherein each retransmitted packet that is sent follows the corresponding intermittent packet with a predetermined delay no greater than a length of two IFS intervals separated by a responsive packet.

2. The method of claim 1, wherein each retransmitted packet that is sent is transmitted on a different wireless frequency than the corresponding intermittent packet.

3. The method of claim 1, wherein each said retransmitted packet that is sent includes the digital audio data of the corresponding intermittent packet and further includes additional error correction information relative to the corresponding intermittent packet.

4. The method of claim 1, wherein the digital audio data is for contralateral routing of signal (CROS) and the responsive packet is an acknowledgement packet.

5. The method of claim 1, wherein the responsive packet comprises a responsive digital audio packet for bidirectional CROS, and wherein the method further comprises sending an acknowledgement packet only if the responsive digital audio packet is successfully received.

6. The method of claim 5, further comprising, after sending the retransmitted packet, listening for a responsive retransmitted packet.

7. The method of claim 1, wherein said sending intermittent packets is performed with frequency hopping by changing to a next frequency in a channel list before sending a next intermittent packet, and wherein the sending employs a reduced channel list for frequency hopping until a low latency link is deemed established by the detection of at least one responsive packet.

8. The method of claim 1, further comprising setting low latency streaming parameters via a Bluetooth Low Energy (BLE) link before sending said intermittent packets.

9. The method of claim 8, wherein the low latency streaming parameter comprises a timing offset between BLE connection intervals and connection intervals for sending the intermittent packets.

10. A low-latency audio streaming device that comprises:
    a transmit chain that periodically transmits intermittent packets of digital audio data as a wireless signal; and
    a receive chain that operates to detect a responsive packet to each intermittent packet, the responsive packet having a predefined length and a start time of one predefined interframe spacing (IFS) interval after the intermittent packet,
    wherein the transmit chain retransmits a packet of digital audio data each time the receive chain fails to detect a responsive packet, wherein the retransmission occurs with a predetermined delay no greater than a length of two IFS intervals separated by a responsive packet.

11. The device of claim 10, wherein each retransmitted packet that is sent is transmitted on a different wireless frequency than the corresponding intermittent packet.

12. The device of claim 10, wherein each said retransmitted packet that is sent includes the digital audio data of the corresponding intermittent packet and further includes additional error correction information relative to the corresponding intermittent packet.

13. The device of claim 10, wherein the digital audio data is for contralateral routing of signal (CROS) and the responsive packet is an acknowledgement packet.

14. The device of claim 10, wherein the responsive packet comprises a responsive digital audio packet for bidirectional CROS, and wherein the transmit chain sends an acknowledgement packet only if the responsive digital audio packet is successfully received.

15. The device of claim 14, wherein after the transmit chain sends the retransmitted packet, the receive chain operates to detect a responsive retransmitted packet.

16. The device of claim 10, wherein the transmit chain performs frequency hopping by changing to a next frequency in a channel list before sending a next intermittent packet, and wherein the transmit chain employs a reduced channel list for frequency hopping until at least one responsive packet is detected.

17. The device of claim 10, wherein the device negotiates a low latency streaming parameter via a Bluetooth Low Energy (BLE) link before sending said intermittent packets.

18. The device of claim 17, wherein the low latency streaming parameter comprises a timing offset between BLE connection intervals and connection intervals for sending the intermittent packets.

19. A wireless system that comprises:
    a first hearing aid for a first ear, the first hearing aid including:

a microphone to capture and digitize an input audio signal into digital audio data; and a first wireless transceiver that operates to send a wireless signal having intermittent packets of the digital audio data, to receive a responsive packet beginning one predefined interframe spacing (IFS) interval after each intermittent packet, and, if a responsive packet is missed, to resend the digital audio data in a retransmission packet beginning one predefined IFS interval after an expected completion of the responsive packet that is missed; and a second hearing aid for a second ear, the second hearing aid including:

a second wireless transceiver that operates to receive said intermittent packets, to send a responsive packet beginning one predefined IFS interval after each intermittent packet that is received, and, if an intermittent packet is missed, to receive a retransmission packet beginning one predefined IFS interval after an expected completion of a responsive packet; and an output transducer that produces an output audio signal based at least in part on the digital audio data in said intermittent packets or said retransmission packets.

20. The system of claim 19, wherein the responsive packets include digitized audio data from an input transducer in the second hearing aid, and wherein the first hearing aid includes an output transducer that produces an augmented audio signal based on the digital audio data from the microphone and the digitized audio data from the input transducer.

* * * * *